United States Patent Office 2,720,522
Patented Oct. 11, 1955

2,720,522

RECOVERY AND/OR PURIFICATION OF PROTOVERATRINE FROM VERATRUM ALBUM

Robert M. Brooker, Indianapolis, Ind., assignor to Allied Laboratories, Inc., Kansas City, Mo., a corporation of Delaware No Drawing. Application November 7, 1952,
Serial No. 319,436

5 Claims. (Cl. 260—236)

This invention relates to the recovery of the alkaloid protoveratrine from *Veratrum album*. More particularly, it relates to a method for separating protoveratrine in a crystalline state and relatively free of other alkaloids of *Veratrum album*.

Lyman C. Craig and Walter A. Jacobs, J. Bio. Chem., 143, pages 427–432 (1942), describe a method for extracting protoveratrine and other alkaloids from *Veratrum album*. In their process, ground roots of *Veratrum album* are extracted with benzene made alkaline with ammonium hydroxide. The benzene solution of the alkaloids is then extracted with aqueous acetic acid. The acid extract is made alkaline and extracted with benzene. This benzene solution is evaporated to dryness, giving a resinous alkaloidal residue. The resinous residue is extracted with ether to remove ether soluble material and leaving a residue comprising protoveratrine together with certain other low ether soluble alkaloids. By repeated crystallization from chloroform-ether mixtures, crystalline protoveratrine is obtained. Certain lots of *Veratrum album*, when processed by the Craig and Jacobs procedure, give satisfactory recovery of protoveratrine in a relatively pure form. In certain other cases, however, the protoveratrine is associated with substantial quantities of other low ether soluble alkaloids that are not readily freed therefrom. In order to produce uniform therapeutic effects, it is desirable that protoveratrine be made consistently available in a relatively pure crystalline form free from association with various other alkaloids of *Veratrum album*.

In accordance with the present invention, I have discovered that n-butyl chloride can be used to replace ether in the prior art process of recovering protoveratrine from *Veratrum album*.

In carrying out my invention, ground *Veratrum album* roots are extracted with ammoniacal benzene. This benzene solution is extracted with aqueous acetic acid. The aqueous acetic acid solution is then made alkaline and extracted with benzene. The benzene solution is evaporated to dryness giving a resinous alkaloidal residue. The resinous alkaloidal residue is treated with hot n-butyl chloride, giving a solution of the mixed alkaloids, including protoveratrine. Upon cooling the n-butyl chloride solution to room temperature, nearly pure protoveratrine precipitates while the other alkaloids remain in solution. In the presence of the other alkaloids, protoveratrine is soluble in boiling n-butyl chloride. In the absence of the other alkaloids, protoveratrine is practically insoluble in n-butyl chloride. The protoveratrine obtained in the first treatment of the mixed alkaloids with boiling n-butyl chloride may contain a small amount of co-precipitated alkaloids. A second treatment with n-butyl chloride will remove the co-precipitated alkaloids and result in a pure protoveratrine product.

It is an advantage of my invention that n-butyl chloride is used to replace ether in the production of protoveratrine and reduces the hazards accompanying the use of ether.

Another advantage of my invention is that the use of the n-butyl chloride leaching procedure results in high yields of pure protoveratrine.

An additional advantage of my invention is that it is uniformly effective in processing *Veratrum album* for the recovery of pure protoveratrine in good yields.

The manner in which my invention can be carried out is illustrated in the following examples:

Example I

A quantity of ground *Veratrum album* roots was extracted with ammoniacal benzene. This benzene solution was extracted with aqueous acetic acid. The aqueous acetic acid solution was then made alkaline with ammonium hydroxide and extracted with benzene. The benzene solution was evaporated to dryness giving a resinous alkaloidal residue.

Five grams of the resinous alkaloidal residue were dissolved in 25 ml. of boiling n-butyl chloride and allowed to cool slowly to room temperature whereupon a solid precipitated. The precipitated solid was recovered by filtration and triturated with 10 ml. of n-butyl chloride while heating to boiling. The n-butyl chloride solution was allowed to cool slowly to room temperature to obtain a yield of 150 mg. of pure crystalline protoveratrine.

Example II

One gram of a resinous mixture of alkaloids obtained by extraction of ground *Veratrum album* roots as described in Example I was leached with 10 ml. of boiling n-butyl chloride and then precipitated. The precipitated material was recovered by filtration and dissolved in 10 ml. of boiling n-butyl chloride. The n-butyl chloride solution was cooled slowly to yield 10 mg. of pure crystalline protoveratrine.

I claim:

1. The method for separating protoveratrine from other *Veratrum album* alkaloids which comprises dissolving in hot n-butyl chloride a mixture of alkaloids, obtained by extracting ground *Veratrum album* roots with ammoniacal benzene, extracting the benzene solution with aqueous acetic acid, making the aqueous solution alkaline, then extracting with benzene, and evaporating said benzene solution to dryness, and separating protoveratrine from the n-butyl chloride solution.

2. The process which comprises treating with hot n-butyl chloride a mixture of *Veratrum album* alkaloids, obtained by extracting ground *Veratrum album* roots with ammoniacal benzene, extracting the benzene solution with aqueous acetic acid, making the aqueous solution alkaline with ammonium hydroxide, then extracting with benzene, and evaporating said benzene solution to dryness, and recovering protoveratrine from the n-butyl chloride solution.

3. The process for recovering protoveratrine from *Veratrum album* which comprises the steps of extracting ground *Veratrum album* roots with ammoniacal benzene, extracting the benzene solution with aqueous acetic acid, making the aqueous solution alkaline, then extracting with benzene and evaporating said benzene solution to dryness to give a resinous alkaloidal residue, treating said resinous alkaloidal residue with boiling n-butyl chloride, and recovering protoveratrine by cooling the n-butyl chloride solution.

4. The process for recovering and purifying protoveratrine from *Veratrum album* which comprises the steps of extracting ground *Veratrum album* roots with ammoniacal benzene, extracting the benzene solution with aqueous acetic acid, making the aqueous solution alkaline with ammonium hydroxide, then extracting with benzene, and evaporating said benzene solution to dryness to give a resinous alkaloidal residue, treating the resinous alkaloidal residue with boiling n-butyl chloride, recovering protoveratrine by cooling the n-butyl chloride solution, and leaching the recovered protoveratrine with hot n-butyl chloride to give a purified protoveratrine.

5. In a process for recovering protoveratrine from *Veratrum album* including the steps of extracting ground *Veratrum album* roots with ammoniacal benzene, extracting the benzene solution with aqueous acetic acid, making the aqueous solution alkaline, then extracting with benzene and evaporating said benzene solution to dryness to give a resinous alkaloidal residue, the improvement which comprises treating the resinous alkaloidal residue with hot n-butyl chloride and cooling said n-butyl chloride solution to obtain protoveratrine.

References Cited in the file of this patent

Craig and Jacobs: 143, 427–432 (1942).
Bredeman: Chem. Zentralblat, 1906, 608.